United States Patent
Estorf et al.

(10) Patent No.: US 10,135,080 B2
(45) Date of Patent: Nov. 20, 2018

(54) TURBINE FOR DECOMPRESSION OF EXHAUST GAS AND A FUEL CELL SYSTEM INCLUDING SAME

(71) Applicant: Volkswagen AG, Wolfsburg (DE)

(72) Inventors: Malte Estorf, Cremlingen (DE);
Johannes Peter, Braunschweig (DE);
Lars Umland, Koenigslutter (DE);
Peter Lueck, Isenbuettel (DE)

(73) Assignee: Volkswagen AG, Wolfsburg (DE)

( * ) Notice: Subject to any disclaimer, the term of this patent is extended or adjusted under 35 U.S.C. 154(b) by 353 days.

(21) Appl. No.: 15/137,615

(22) Filed: Apr. 25, 2016

(65) Prior Publication Data

US 2016/0315336 A1 Oct. 27, 2016

(30) Foreign Application Priority Data

Apr. 27, 2015 (DE) .................. 10 2015 207 679

(51) Int. Cl.
| | |
|---|---|
| *H01M 8/04119* | (2016.01) |
| *F01D 25/24* | (2006.01) |
| *H01M 8/04828* | (2016.01) |
| *F01D 25/32* | (2006.01) |

(52) U.S. Cl.
CPC ........ *H01M 8/04156* (2013.01); *F01D 25/24* (2013.01); *F01D 25/32* (2013.01); *H01M 8/04843* (2013.01); *F05D 2220/40* (2013.01)

(58) Field of Classification Search
CPC ........ F01D 25/24; F01D 2220/40; F01D 1/08; F01D 1/22; H01M 8/0441; H01M 8/04156

USPC ................ 415/120, 204, 205; 429/408
See application file for complete search history.

(56) References Cited

U.S. PATENT DOCUMENTS

| | | | |
|---|---|---|---|
| 3,380,711 A | 4/1968 | Blattner et al. | |
| 7,700,207 B2 | 4/2010 | Hild | |
| 2011/0110766 A1* | 5/2011 | Moore | F01D 17/143 415/158 |

FOREIGN PATENT DOCUMENTS

| | | |
|---|---|---|
| DE | 37 24 385 A1 | 2/1989 |
| DE | 100 14 810 A1 | 10/2001 |
| DE | 10 2007 052 831 A1 | 5/2008 |
| EP | 0 246 039 A2 | 11/1987 |

(Continued)

*Primary Examiner* — Cynthia H Kelly
*Assistant Examiner* — Rashid A Alam
(74) *Attorney, Agent, or Firm* — Davidson, Davidson & Kappel, LLC

(57) ABSTRACT

A turbine for decompression of air, including a spiral housing, including a spiral housing inlet for inflow of an airflow, a turbine wheel chamber situated in the spiral housing, in which at least one turbine wheel is mounted rotatably about an axis of rotation and which has at least one turbine outlet, a circulation channel situated in the spiral housing and extending azimuthally to the axis of rotation in at least some sections for guiding the airflow onto the turbine wheel, the circulation channel having an inside surface in which at least one outlet channel extending azimuthally to the axis of rotation is situated, the outlet channel having an outlet duct and the circulation channel having a circumferential line in its cross section, the circumferential line being subdivided so that a first partial length of the circumferential line of the circulation channel being shorter than a second partial length.

12 Claims, 2 Drawing Sheets

(56) References Cited

FOREIGN PATENT DOCUMENTS

JP S6022025 A 2/1985

* cited by examiner

TURBINE FOR DECOMPRESSION OF EXHAUST GAS AND A FUEL CELL SYSTEM INCLUDING SAME

This claims the benefit of German Patent Application DE 10 2015 207 679.2, filed Apr. 27, 2015 and hereby incorporated by reference herein.

The present invention relates to a turbine for decompression of air, including a spiral housing having a spiral housing inlet for inflow of an airflow; a turbine wheel chamber situated in the spiral housing in which at least one turbine wheel is mounted rotatably about an axis of rotation and which has at least one turbine outlet; a circulation channel extending azimuthally to the axis of rotation in at least some sections and situated in the spiral housing for guiding the airflow onto the turbine wheel, the circulation channel having an inside surface, in which at least one outlet channel extending azimuthally to the axis of rotation is situated. The present invention also relates to a fuel cell system including such a turbine.

BACKGROUND

Use of turbines in fuel cell systems is known. In the cathode exhaust gas path they are used for decompression of exhaust air, optionally with partial drive of a turbocharger for the cathode supply. These turbines are usually radial turbines.

DE 100 14 810 A1, EP 0 246 039 A2, DE 10 2007 052 831 A1, DE 37 24 385 A1 and JP 60022025 A describe turbines of exhaust gas turbochargers for internal combustion engine fuel cells.

U.S. Pat. No. 3,380,711 describes a turbine including a combined dust separator. The turbine generates a mechanical output, which may be used to drive a compressor or to generate electrical power. The turbine has an azimuthally circulatory channel, on which a channel, also running peripherally, is integrally molded for collecting dust particles. The channel outside of the turbine housing carries the particles of dust for discharge, running tangentially to the axis of rotation of the turbine in its outlet section.

SUMMARY OF THE INVENTION

The action principle of radial turbines is supported by spiral housings in which the air is accelerated, so that there is a pressure drop between a spiral housing inlet and a spiral housing outlet. The decline in static enthalpy of the exhaust gas flow is associated with the pressure drop and may result in condensation of water in the spiral housing during operation of the turbine. The water droplets thereby formed may cause erosion damage on the turbine blades.

This problem relates in particular to fuel cell systems in whose cathode exhaust gas paths turbines are installed since the cathode exhaust gas entrains a comparatively large amount of wetness due to the water formed by the fuel cell reaction. Due to the described pressure drop, the arrangement of droplet separators upstream from the turbine cannot completely prevent water from condensing in the turbine and therefore cannot completely prevent erosion damage.

It is an object of the present invention to provide a turbine, which will eliminate or at least minimize the problems of the prior art as described.

The present invention provides a turbine for decompression of air, including:
- a spiral housing, which has a spiral housing inlet for inflow of an airflow,
- a turbine wheel chamber situated in the spiral housing, in which at least one turbine wheel is mounted rotatably about an axis of rotation and which has at least one turbine outlet,
- a circulation channel, which is situated in the spiral housing and extends azimuthally to the axis of rotation in at least some sections, for guiding the airflow onto the turbine wheel, the circulation channel having an inside surface in which at least one outlet channel extending azimuthally to the axis of rotation is situated, the outlet channel having an outlet duct for draining off condensate out of the turbine, and the circulation channel having a circumferential line in its cross section, which is formed by an open side edge of the outlet channel in this cross section, where it is subdivided into two partial lengths.

According to the present invention, a first partial length of the circumferential line of the circulation channel is shorter than a second partial length.

In a second aspect of the present invention, the present invention provides a fuel cell system, including at least one fuel cell stack, a cathode gas supply and an anode gas supply, the cathode gas supply including a first cathode exhaust gas path, in which the turbine according to the present invention is situated.

Thus, according to the present invention, the circulation channel is no longer symmetrical to the turbine chamber inlet, and the outlet channel of the turbine is not situated along the exact peripheral extent of the circulation channel (the circumferential line would be interrupted approximately centrally by the outlet channel) but instead is situated offset from this, resulting in two partial lengths of the circumferential line of different lengths.

Within the scope of the present invention, a section along a plane in which the axis of rotation of the turbine wheel runs is understood by the term "cross section" of the circulation channel and/or outlet channel. The cross section therefore runs essentially perpendicularly to the main flow direction of the circulation channel.

In this way, in addition to the centrifugal main flow in the circulation channel, a tubular secondary flow is created in the circulation channel which drives a condensate formed on the inside surface of the circulation channel in the direction of the outlet channel integrally formed asymmetrically on the circulation channel. This transport is in turn supported by a tubular tertiary flow inside this outlet channel, which is directed in the opposite direction from the secondary flow in the circulation channel.

The function of a droplet separator is thus integrated into the turbine according to the present invention in a manner to prevent damage to the turbine due to condensate that is thrown off. Integration of the droplet separator eliminates the need for additional components, for example, separate droplet separators, which would otherwise have to be installed upstream from the turbine. This saves on costs (acquisition, operation and maintenance costs) as well as installation space. Furthermore, the air is dried during operation of the turbine.

In one preferred specific embodiment, the first partial length amounts to at most 35% of the second partial length of the circumferential line of the circulation channel, in particular at most 30%, preferably at most 20%. The smaller the first partial length is in comparison with the second, i.e., the farther the offset of the outlet channel with respect to a symmetrical arrangement, relating to the axis of rotation of the turbine, the greater the drainage of water and water droplets.

The outlet channel is introduced into a recess in the circulation channel and runs essentially in the same direction as the latter. The transition between the circulation channel and the outlet channel is preferably formed as an edge or step. The outlet channel is thus delimited by two edges running laterally to the outlet channel. In the cross section of the circulation channel and the outlet channel, this yields one step on each side of the outlet channel. The provision of the transition between the circulation channel and the outlet channel in the form of an edge and/or step yields the advantage in comparison with a rounded profile in that it creates a separation point for the flow passing over the edge (see below).

The term "circumferential line" in the present case refers to a cross section of the circulation channel across its main flow direction. The circumferential line is interrupted, on the one hand, by an access to the turbine chamber (turbine chamber inlet) and, on the other hand, by the outlet channel, which extends essentially in parallel to the circulation channel. The circumferential line is thus divided into two partial lengths. The second (longer) partial length forms a deposition surface for the condensate. It extends preferably with respect to a flow direction of the tubular second flow in the circulation channel, starting from a second rim (downstream in the secondary flow) of the turbine chamber inlet to a first rim of the outlet channel (upstream in the secondary flow). The larger the deposition surface, the more water is deposited on it. The first (shorter) partial length extends preferably, with respect to the flow direction of the tubular secondary flow in the circulation channel, from a second rim of the outlet channel (downstream in the secondary flow) to a first rim of the turbine chamber inlet (upstream in the secondary flow). The surface associated with the first partial length thus forms an inflow surface to the turbine chamber. The deposition surface associated with the second partial length is thus larger than the inflow surface.

In embodiments of the present invention, the outlet duct extends between the outlet channel and an exterior side of the spiral housing. Condensation water may thus be drained out of the turbine through the outlet duct. The normal of the outlet surface of the outlet duct preferably forms an angle of at most ±20°, in particular at most ±10° to the normal of the axis of rotation. The angle is particularly preferably 0°, i.e., the outlet duct extends essentially perpendicularly to the axis of rotation.

In another preferred embodiment of the present invention, it is provided that the outlet channel has a curved contour without any discontinuities in the cross section, in particular being shaped essentially as an ellipse. This embodiment supports the design of the tubular tertiary flow inside the outlet channel. An ellipse has two secondary foci and two main foci plus a steady curvature progression over the entire circumference. The edges between the circulation channel and the outlet channel situated between the main foci of the ellipse have preferably a sharp-edged design. In this way, a separation point for the flow is formed on the upstream edge and a stagnation point (or contact point) is formed on the downstream edge of the outlet channel. The flow line between the two points separates the secondary flow from the tertiary flow. The steady curvature progression inside the channel prevents any other separation on the wall of the outlet channel.

In another preferred embodiment of the present invention, it is provided that the circulation channel has essentially a curved cylindrical shape, so that the (interrupted) circumferential line is formed essentially as a circle. The advantage of this embodiment is that an asymmetry of edge lengths is formed in a cylinder shape due to the outlet channel. Cylinders have a circular cross section. The circumference of a circle may be divided into two partial circumferences of equal length. When an outlet channel is manufactured in one of the two partial circumferences of the same length, and the turbine chamber inlet is also situated in the same partial circumference, this results in the desired asymmetry. The asymmetrical arrangement promotes the tubular secondary flow jointly with the essentially circular cross section of the circulation channel, which thus is also free of any discontinuity in the curvature.

In another preferred embodiment of the present invention, it is provided that the circulation channel is designed with a length of at least ⅔ of the azimuthal circumference of the spiral housing, i.e., over an angular extent of at least 240°, based on the axis of rotation of the turbine. It is advantageous that water and droplets of water may be conveyed along a spiral housing length into the outlet channel.

The inside surface of the circulation channel is subdivided, as explained above, into a deposition surface and an inflow surface, each being delimited by the outlet channel and the turbine chamber inlet. If the circulation channel and the outlet channel extend over at least ⅔ of the azimuthal extent of the spiral housing, then the deposition surface and the inflow surface also extend over this length.

According to another advantageous embodiment, an inner cross-sectional area of the circulation channel is reduced in the main flow direction, so that, on the one hand, a reduction in the mass flow is taken into account by the radial outflow through the turbine wheel and, on the other hand, an acceleration of the flow is created.

In another preferred embodiment of the present invention, it is provided that the turbine also has an arrangement of guide blades in the spiral housing inlet or in an entrance into the circulation channel of the spiral housing for generating a vortex from the air. This arrangement supports the development of the secondary flow within the circulation channel.

In another preferred embodiment of the present invention, it is provided that the arrangement of guide blades is formed without a hub. The arrangement thus lacks a central hub on the flow axis, on which the guide blades are mounted. Instead the guide blades are preferably mounted on an inside surface of the spiral housing inlet or of the entrance into the circulation channel. In this way, a free vortex core is formed from the blade-tip vortices between the free ends of the guide blades, so that the development of a vortex is promoted. Vortices have a spin. One component of the spin acts in the direction of the centrifugal force. The arrangement of guide blades reinforces this.

The various specific embodiments of the present invention named in this patent application may be advantageously combined with one another, unless otherwise indicated in the individual case.

BRIEF DESCRIPTION OF THE DRAWINGS

The present invention is explained below in exemplary embodiments on the basis of the respective drawings.

DETAILED DESCRIPTION

Figure 1:
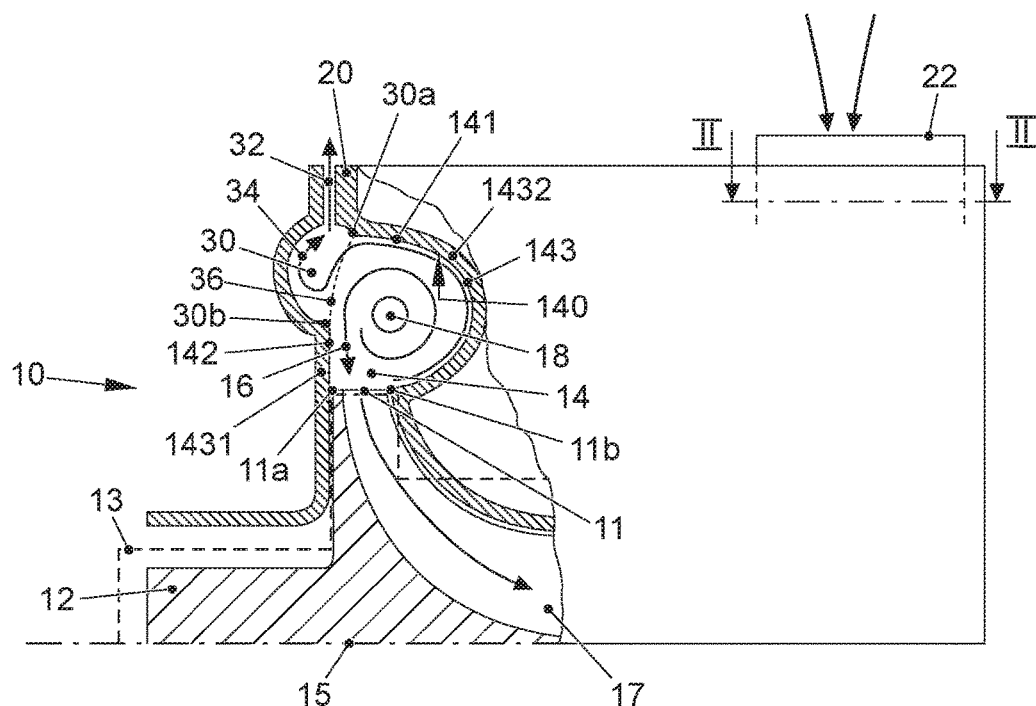
FIG. 1 shows a section through a turbine according to the present invention.

FIG. 1 shows the structural design of a turbine according to the present invention, labeled with reference numeral 10 on the whole. During usage, turbine 10 is used for drying and decompressing wet exhaust gas flows, in particular from fuel cells.

Turbine 10 is constructed from a plurality of parts. In the preferred specific embodiment illustrated in FIG. 1, turbine 10 includes a spiral housing 20, which has a spiral housing inlet 22 for inflow of an airflow. Spiral housing inlet 22 is situated on a first end of spiral housing 20. The spiral housing may have a one-part or multi-part design.

At least one turbine wheel chamber 13 is situated inside spiral housing 20, in which a turbine wheel 12 is mounted rotatably about an axis of rotation 15. Turbine wheel chamber 13 has a peripherally encompassing turbine wheel chamber inlet 11 and a central turbine outlet 17. The axis of rotation 15 is coaxial with the axis of rotation of a shaft on which turbine wheel 12 rests.

Furthermore, a circulation channel 14 running azimuthally to the axis of rotation 15 is formed inside spiral housing 20 and extends within the radial circumference of spiral housing 20 in at least some sections. Circulation channel 14 thus encompasses turbine wheel chamber 13. In a preferred specific embodiment, the circulation occurs over the length of a section. The length of a section may vary. In a preferred specific embodiment, it encompasses turbine wheel chamber 13 over a length of at least ⅔)(≥240° of the circumference of turbine wheel chamber 13. In an alternative specific embodiment, circulation channel 14 encompasses turbine wheel chamber 13 at least completely)(≥360°. An encompassment of more than 360° may advantageously also be provided in which circulation channel 14 may extend in a spiral pattern inside of spiral housing 20.

An outlet channel 30 is embedded in spiral housing 20, extending along circulation channel 14 and forming together with the latter a joint working channel. In a preferred specific embodiment, outlet channel 30 is in the form of an ellipse in cross section. The ellipse is open toward one side (at the right in FIG. 1) so that the outlet channel 30 has an open side edge 36 in the cross section shown here. The open side edge 36 is delimited by a first rim 30a and a second rim 30b of outlet channel 30. In one preferred specific embodiment, the opening extends through the main focus of the ellipse. Other embodiments of outlet channel 30 are alternatively also possible.

Circulation channel 14 has an inside surface 140. This inside surface 140 has a circumferential line 143 in cross section having essentially the profile of a circle in the specific embodiment shown here. Circumferential line 143 is subdivided by outlet channel 30 and turbine chamber inlet 11 into two partial lengths 1431 and 1432. A first partial length 1431 extends between between second rim 30b of outlet channel 30 and a first rim 11a of turbine wheel inlet 11. A second partial length 1432 extends between second rim 11b of turbine chamber inlet 11 and first rim 30a of outlet channel 30. Rims 30a, 30b of outlet channel 30 are each shaped in the form of an edge, so that the cross section of circulation channel 14 and of outlet channel 30 has steps.

First partial length 1431 is shorter than second partial length 1432. Outlet channel 30 is therefore not positioned in the area of the peripheral circumference of circulation channel 14 but instead is offset asymmetrically from it. First partial length 1431 amounts to at most 20% of second partial length 1432 in particular.

The inside surface of circulation channel 14 extending over second length 1432 forms a condensate deposition surface 141. The inside surface of circulation channel 14 extending over first length 1431 forms an inflow surface 142 to turbine wheel chamber 13.

Turbine 10 also has an outlet duct 32 which connects outlet channel 30 to the surroundings of the turbine, i.e., to the outside, and is used to drain off the condensate. Outlet duct 32 extends between outlet channel 30 and the outside of spiral housing 20. Its entrance surface is situated at an angle of 90±20°, in particular 90°±10°, to axis of rotation 15. In a preferred specific embodiment, outlet duct 32 is cast with outlet channel 30 in one casting. Alternatively, however, the outlet duct may also be subsequently drilled. Furthermore, outlet duct 32 may be formed as one or more separate openings. Alternatively, outlet duct 32 may extend in the form of a continuous radial slot around the entire peripheral circumference of housing 20.

Turbine 10, shown in FIG. 1, has the following function:

A gas flow (for example, an airflow) to be decompressed enters spiral housing 20 through inlet 22 and flows tangentially into circulation channel 14, where the gas flow is accelerated and enters turbine chamber 13 through turbine chamber inlet 11 and drives turbine wheel 12, so that it is induced to rotate and may in turn drive another component via a shaft. The gas flow thus delivers kinetic energy to turbine wheel 12 and exits turbine 10 at a reduced pressure through outlet 17. The gas flow is thus decompressed with the aid of turbine wheel 12.

A main flow 18 develops in circulation channel 14 in the direction of the axial course of circulation channel 14. Main flow 18 in FIG. 1 runs orthogonally to the plane of the paper. At the same time, a tubular secondary flow 16 develops inside circulation channel 14. Secondary flow 16 here flows over deposition surface 141 formed along second partial length 1432 from second rim 11b of turbine chamber inlet 11 in the downstream secondary flow in the direction of first rim 30a of outlet channel 30 in the upstream secondary flow end. Secondary flow 16 passes over open edge 36 of channel 30 and flows further over inflow surface 142 of inside surface 140 formed along first partial length 1431 from rim 30b of channel 30 in the downstream secondary flow to rim 11a of turbine chamber inlet 11 from which the gas flow flows into turbine wheel chamber 13. Furthermore, a tubular tertiary flow 34 circulating in the opposite direction from the secondary flow 16 develops inside of outlet channel 30.

In addition to the effect of decompression of the gas flow, turbine 10 according to the present invention also ensures drying of same, i.e., a reduction of the wetness. The drying takes place according to the principle of heavier masses. The shape of spiral housing 20 and of circulation channel 14 effectuates a centrifugal force by accelerating the gas flow in main flow 18. Wetness condenses in the gas flow due to the static enthalpy, which decreases within circulation channel 14. The centrifugal force acts on extremely fine liquid droplets in the gas flow and forces them against the deposition surface of inside surface 140. The liquid droplets therefore settle on deposition surface 141. Tubular secondary flow 16 promotes the transport of the liquid film formed on deposition surface 141 in the direction of outlet channel 30. Tertiary flow 34 flowing in the opposite direction from tubular secondary flow 16 drives the liquid inside outlet channel 30 in the direction of and through outlet duct 32 to the surroundings. The wetness of the gas flow acting upon turbine wheel 12 is thus removed. This prevents droplets of condensation from reaching turbine wheel 12, and thus erosive damage to same is prevented.

Figure 2:
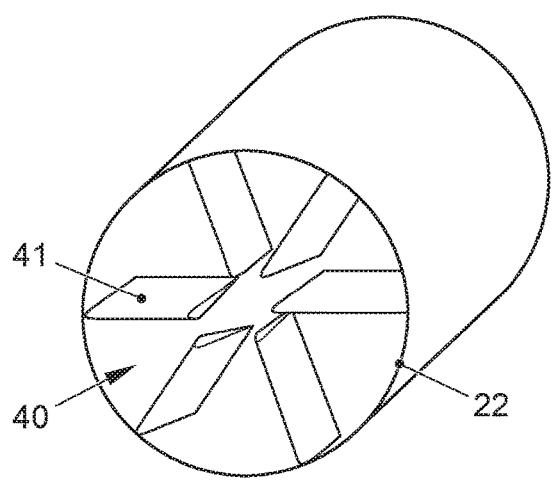
FIG. 2 shows an arrangement of peripheral blades in a turbine according to the present invention.

FIG. 2 shows one advantageous refinement of the turbine according to the present invention. This shows only spiral housing inlet 22. The remaining design corresponds to that according to FIG. 1.

An arrangement 40 of six guide blades 41 in spiral housing inlet 22 is shown in this example. However, the number of guide blades 41 is variable. In the preferred specific embodiment shown here, guide blades 41 form a star pattern, in which guide blades 41 are fastened onto the inside wall of spiral housing inlet 22 at their first end and protrude at their second free end into the flow cross section without contact. In this specific embodiment, the flow axis of guide blades 41 therefore does not have a central hub.

During operation of the embodiment shown in FIG. 2 a vortex develops around the free ends of the guide blades 41, i.e., at the tips of the blades. The individual blade-tip vortices form a free vortex core in the hub-free flow axis. The vortex core results in further support for secondary flow 16 inside circulation channel 14 (FIG. 1). The drying effect that has been described is intensified in this way.

Figure 3:
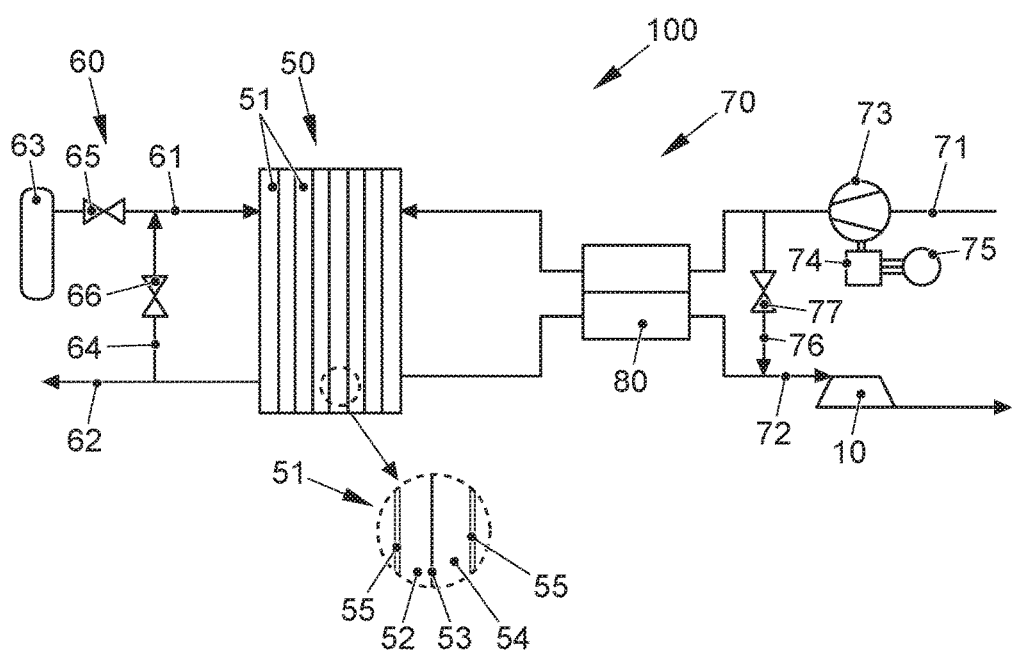
FIG. 3 shows a fuel cell system.

Turbine 10 according to the present invention as shown in FIG. 1 or 2 effectuates drying and decompression of a gas flow and is therefore particularly suitable for use for wet gas flows in particular, for example, a cathode exhaust gas flow from fuel cells. According to a preferred embodiment of the present invention, such a fuel cell system 100 is shown in FIG. 3.

Fuel cell system 100 is part of a vehicle, in particular an electric vehicle, including an electric traction motor, which is supplied with electrical power from fuel cell system 100.

Fuel cell system 100 includes as the core component a fuel cell stack 50, including a plurality of single cells 51 situated in stack form. Each individual cell 51 includes an anode space 52 and a cathode space 54 which are separated from one another by an ion-conductive polymer electrolyte membrane 53 (see detail). Anode space 52 and cathode space 54 each include a catalytic electrode, the anode and the cathode, which catalyze the respective partial reaction of the fuel cell conversion. The anode and cathode electrodes include a catalytic material, for example, platinum, which is supported on an electrically conductive carrier material of a large specific surface area, for example, a carbon-based material. Between two such membrane electrode units a bipolar plate indicated by reference numeral 55 is also situated, which is used to supply operating media to anode space 52 and cathode space 54 and also establishes the electrical connection between individual fuel cells 51.

To supply operating gases to fuel cell stack 50, fuel cell system 100 includes, on the one hand, an anode gas supply 60 and, on the other hand, a cathode gas supply 70.

Anode gas supply 60 includes an anode supply path 62, which is used to supply an anode operating medium (the fuel), for example, hydrogen, to anode spaces 52 of fuel cell stack 50. For this purpose, anode supply path 62 connects a fuel tank 63 to an anode inlet of fuel cell stack 50. Anode gas supply 60 also includes an anode exhaust gas path 62, which discharges the anode exhaust gas from anode spaces 52 via an anode outlet of fuel cell stack 50. The anode operating pressure on the anode sides of fuel cell stack 50 is adjustable via an actuator 65 in anode supply path 62. In addition, anode gas supply 60, as shown here, may have a fuel recirculation line 64 which connects anode exhaust gas path 62 to anode supply path 61. Recirculation of fuel is customary to recycle fuel, which is mostly used hyperstoichiometrically, back to stack 50 and utilize it. An additional actuator 66, with which the recirculation rate is adjustable, is situated in fuel recirculation line 64.

Cathode gas supply 70 includes a cathode supply path 71, which supplies an oxygenated cathode operating medium, in particular air which is drawn in from the surroundings, to cathode spaces 54 of fuel cell stack 50. Cathode gas supply 70 also includes a cathode exhaust gas path 72, which discharges the cathode exhaust gas (in particular the exhaust air) out of cathode spaces 54 of fuel cell stack 50 and sends it, if necessary, to an exhaust gas system. A compressor 73 is situated in cathode supply path 71 for conveyance and compression of the cathode operating medium. In the exemplary embodiment shown here, compressor 73 is designed as a compressor driven mainly by an electric motor whose drive takes place by an electric motor 74 equipped with corresponding power electronics 75. Compressor 73 may also be supportively driven by a turbine 10 according to the present invention, situated in cathode exhaust gas path 72, via a shared shaft. Turbine 10 is an expander which effectuates an expansion of the cathode exhaust gas and thus a reduction in its pressure.

A wastegate line 76 connects cathode supply path 71 to cathode exhaust gas path 72 to bypass fuel cell stack 50 in order to regulate a quantity of air supplied to stack 50 in accordance with its power demand. An actuator 77 is provided for this purpose.

In addition, cathode supply 70 includes a wetting unit 80, through which the fresh cathode operating medium, on the one hand, and the cathode exhaust gas, on the other hand, flow. The two gas flows are guided over a water vapor-permeable membrane, resulting in a transfer of wetness from a relatively wet exhaust gas flow to the inflow to be wetted.

Despite the removal of wetness from the cathode gas (the exhaust air) taking place in wetting unit 80, condensation of water in turbine 10 and thus damage to same cannot be prevented in the prior art. This problem is solved in a simple, inexpensive and space-saving manner by using turbine 10 according to the present invention.

LIST OF REFERENCE NUMERALS 10 turbine
11 turbine wheel chamber inlet
11a first rim of turbine wheel chamber inlet
11b second rim of turbine wheel chamber inlet
12 turbine wheel
13 turbine wheel chamber
14 circulation channel
140 inside surface
141 deposition surface
142 inflow surface
143 circumferential line
1431 first partial length
1432 second partial length
15 axis of rotation
16 secondary flow
17 turbine outlet
18 main flow
20 spiral housing
22 spiral housing inlet
30 outlet channel
30a first rim of outlet channel
30b second rim of outlet channel
32 outlet duct
34 tertiary flow
36 open side edge
40 guide blade arrangement
41 guide blades
100 fuel cell system
50 fuel cell stack
51 single cell
52 anode space
54 cathode space 53 polymer electrolyte membrane
55 bipolar plate
60 anode gas supply
61 anode supply path
62 anode exhaust gas path
63 fuel tank
64 recirculation line
65 actuator
66 actuator
70 cathode gas supply
71 cathode supply path
72 cathode exhaust gas path
73 compressor
74 electric motor
75 power electronics
76 wastegate line
77 actuator
80 wetting unit

What is claimed is:

1. A turbine for decompression of air, comprising:
a spiral housing, including a spiral housing inlet for inflow of an airflow;
a turbine wheel chamber situated in the spiral housing, at least one turbine wheel being mounted rotatably about an axis of rotation in the turbine wheel chamber and having at least one turbine outlet;
a circulation channel situated in the spiral housing and extending azimuthally to the axis of rotation in at least some sections for guiding the airflow onto the turbine wheel, the circulation channel having an inside surface, at least one outlet channel extending azimuthally to the axis of rotation being situated in the circulation channel, the outlet channel having an outlet duct and the circulation channel having a circumferential line in cross section, the circumferential line being subdivided into two partial lengths by an open side edge of the outlet channel in cross section, a first partial length of the circumferential line of the circulation channel being shorter than a second partial length.

2. The turbine as recited in claim 1 wherein the first partial length amounts to at most 35% of the second partial length of the circumferential line of the circulation channel.

3. The turbine as recited in claim 2 wherein the first partial length amounts to at most 30% of the second partial length of the circumferential line of the circulation channel.

4. The turbine as recited in claim 1 wherein the first partial length amounts to at most 20% of the second partial length of the circumferential line of the circulation channel.

5. The turbine as recited in claim 1 wherein the outlet duct extends between the outlet channel and an outside of the spiral housing, a normal of an outlet surface forming an angle of at most ±20° with a normal of the axis of rotation.

6. The turbine as recited in claim 1 wherein the outlet channel has a curved contour without any discontinuities in cross section.

7. The turbine as recited in claim 6 wherein the outlet channel is shaped as an ellipse.

8. The turbine as recited in claim 1 wherein the circulation channel has a curved cylindrical shape, so that the circumferential line is formed as a circle.

9. The turbine as recited in claim 1 wherein the circulation channel is formed to extend over a length of at least ⅔ of a circumference of the spiral housing.

10. The turbine as recited in further comprising an arrangement of guide blades for generating a vortex, the arrangement being situated in the spiral housing inlet or in an entrance in the circulation channel of the spiral housing.

11. The turbine as recited in claim 10 wherein the arrangement of guide blades is designed without a hub.

12. A fuel cell system comprising:
at least one fuel cell stack;
an anode gas supply; and
a cathode gas supply, the cathode gas supply including a cathode exhaust gas path,
the which a turbine as recited in claim 1 being situated in the cathode exhaust path.

* * * * *